Aug. 28, 1934.    H. A. KNOX    1,971,348
TRACK FOR TRACKLAYING VEHICLES
Filed Sept. 19, 1933
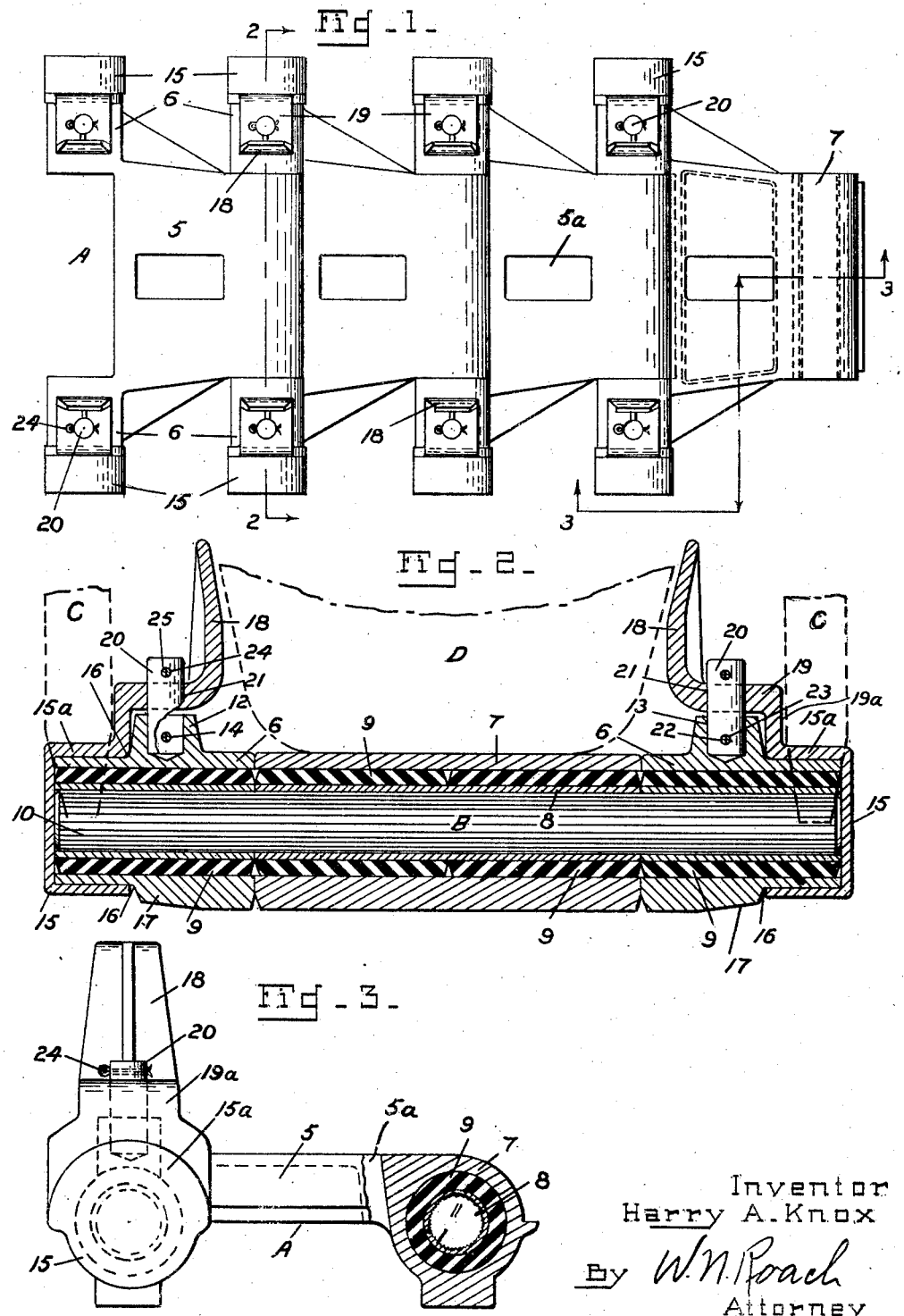
Inventor
Harry A. Knox
By W. N. Roach
Attorney Patented Aug. 28, 1934

1,971,348

UNITED STATES PATENT OFFICE 1,971,348

TRACK FOR TRACKLAYING VEHICLES

Harry A. Knox, Davenport, Iowa

Application September 19, 1933, Serial No. 690,103

7 Claims. (Cl. 305—10)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a track for track-laying vehicles.

The purpose of the invention is to provide a novel mounting of a combination driving and guide member on the end bearings of the link of a track. The member is arranged to act as a dust cap for the joint of the track and to confine the link pin connecting adjacent links.

To these and other ends, the invention consists in the construction, arrangement and combination of elements described hereinafter and pointed out in the claims forming a part of this specification.

A practical embodiment of the invention is illustrated in the accompanying drawing, wherein:

Fig. 1 is a plan view, of a portion of the lower flight of the improved track.

Fig. 2 is a sectional view on the line 2—2 of Fig. 1.

Fig. 3 is a view in side elevation and partly in section, taken on the line 3—3 of Fig. 1.

The track comprises a series of grousers or shoes A, constituting link members connected by means of link pins B.

The shoes are all identical and each one consists of a body 5 forming a rail and having a centrally located aperture 5a to reduce weight and to provide an opening for clearing mud and dirt. The body 5 has spaced bearings 6—6 on one end and a single centrally located bearing 7 on the opposite end whose width is substantially equal to the spacing between the end bearings. When two shoes are assembled end to end the bearing 7 of one shoe is adapted to fit between the spaced bearings 6 of the other shoe.

Within each of the bearings is a bushing consisting of an inner metal tube 8 and an outer rubber sleeve 9 vulcanized to the metal tube. The bushing is inserted in the bearing by compressing the rubber sleeve and it is thereby firmly held in place.

The link pin B passes through the aligned bearings 6 and 7 of adjoining shoes. The pin is provided along its entire length with serrations or teeth 10 interengaging with similar serrations or teeth 11 in the metal tubes 8. By virtue of this arrangement the link pin B is held against free rotational movement when either one of the adjoining shoes are flexed and the angular movement occurs through distortion of the rubber sleeves 9.

The end bearings are formed on their inner or wheel side with a lug 12 positioned in spaced relation to the outer end of the bearing. Each lug is provided with a recess 13 and with a smaller aperture 14 whose axis passes through the recesses.

A cap 15 constituting a driving member and having a thickened portion 15a adapted to engage or be engaged by a sprocket C is slipped on the outer end of each bearing 6 with its rim 16 engaging the lug 12 and the ground cleat 17. The cap also serves as a dust and dirt protector for the joint and confines the link pin B.

A member 18 which preferably is of sufficient extent to constitute a guide for a wheel D is formed integrally with each cap and includes an offset portion 19 overlying the lug 12. A pin 20 inserted through an aperture 21 in the offset portion 19 has one end received into the recess 13 in the lug 12. The pin 20 is conveniently held in place by a cotter pin 22 passing through the aperture 14 of the lug and an aperture 23 of the pin. A second cotter pin 24 is passed through an aperture 25 which is located in the exposed end of the pin 20 projecting beyond the offset portion 19 of the wheel guide 18. The pin 20 holds the driving and guide member 15 and 18 in place on the bearing 6 of a link and additionally holds it against rotational movement relative thereto. The portion 19a of the wheel guide 18 serves to take the side thrust of the sprocket chain.

I claim.

1. In a track for track-laying vehicles, a link having spaced bearings, a lug on each bearing positioned on the wheel side of the bearing and spaced from the outer end of the bearing, said lug having a recess, a link pin passing through the bearings, a cap fitting on the outer end of each bearing and engaging the lug, a member on the cap having an offset portion overlying the lug, a pin passing through the offset portion and receivable in the recess of the lug and means for securing the pin in place.

2. In a track for track-laying vehicles, a link having spaced bearings, a lug on each bearing positioned on the wheel side of the bearing and spaced from the outer end of the bearing, said lug having a recess, a link pin passing through the bearings, a cap fitting on the outer end of each bearing, a member on the cap having an offset portion overlying the lug, a pin passing through the offset portion and receivable in the recess of the lug, and means for securing the pin in place.

3. In a track for track-laying vehicles, a link having spaced bearings, a lug on each bearing positioned on the wheel side of the bearing and spaced from the outer end of the bearing, said lug having a recess, a link pin passing through the bearings, a cap fitting on the outer end of each bearing, a member on the cap having an offset portion overlying the lug, a pin passing through the offset portion and receivable in the recess of the lug.

4. In a track for track-laying vehicles, a link having spaced bearings, a link pin passing through the bearings, a cap fitting on the outer end of each bearing and confining the link pin, a member on the cap having an offset portion overlying the bearing and a pin passing through the offset portion and engageable with the bearing.

5. In a track for track-laying vehicles, a link having spaced bearings, a link pin passing through the bearings, a cap fitting on the outer end of each bearing and confining the link pin, a member on the cap having an offset portion overlying the bearing, a wheel guide on the offset portion, and means for securing the cap in place on the bearing.

6. In a track for track-laying vehicles, a link having spaced bearings, a link pin passing through the bearings, a cap fitting on the outer end of each bearing and confining the link pin, said cap having a thickened portion adapted to be engaged by a sprocket wheel, and means for securing the cap in place on the bearing.

7. In a track for track-laying vehicles, a link having spaced bearings, a link pin passing through the bearings, a cap fitting on the outer end of each bearing and confining the link pin, a wheel guide on the cap and means for securing the cap in place on the bearing.

HARRY A. KNOX.